Feb. 28, 1967 L. A. WOOLLEY 3,307,056
MOTOR CONSTRUCTION INCLUDING A SLIDING STOP MEMBER
OF A UNIDIRECTIONAL DRIVE MECHANISM
Filed Oct. 15, 1962 3 Sheets-Sheet 2
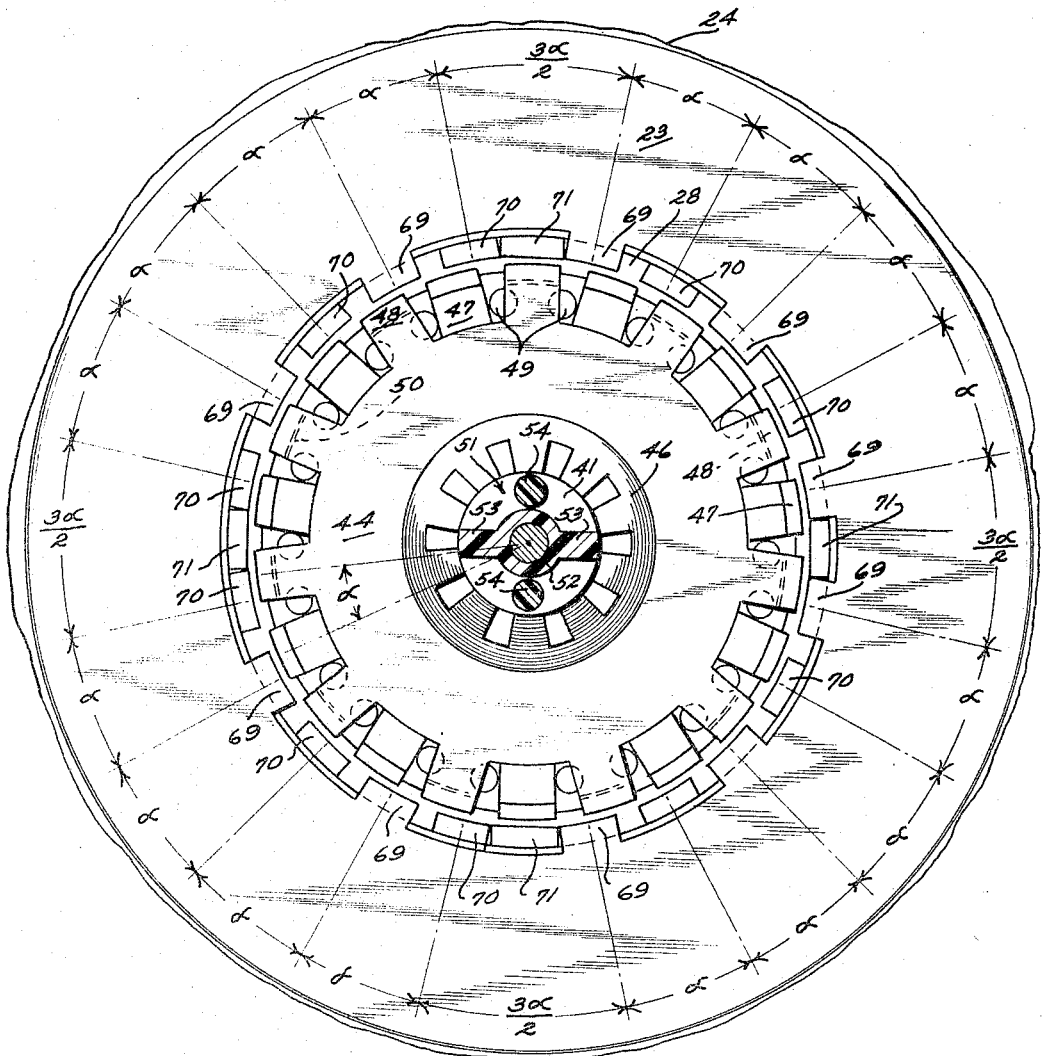
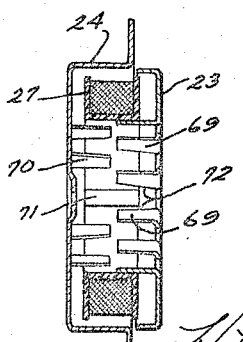
INVENTOR.
LEE A. WOOLLEY
BY
ATTORNEYS Feb. 28, 1967 L. A. WOOLLEY 3,307,056
MOTOR CONSTRUCTION INCLUDING A SLIDING STOP MEMBER
OF A UNIDIRECTIONAL DRIVE MECHANISM
Filed Oct. 15, 1962 3 Sheets-Sheet 3
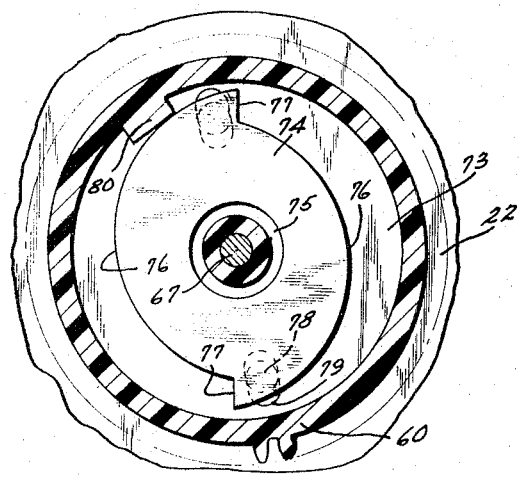
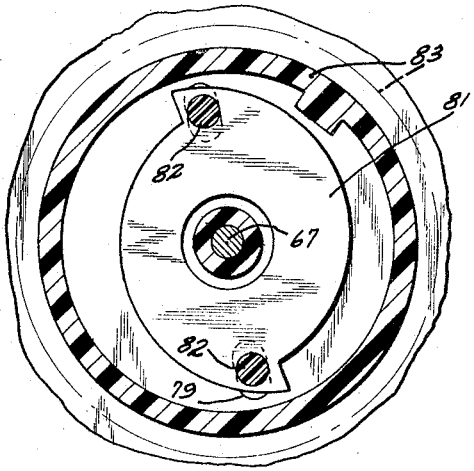
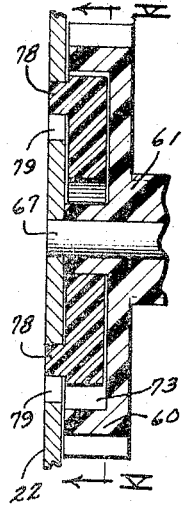
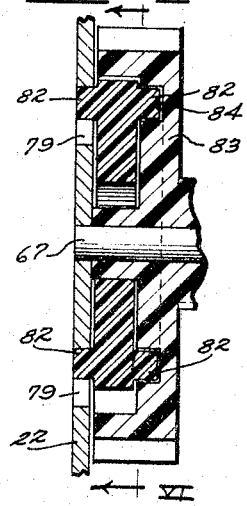
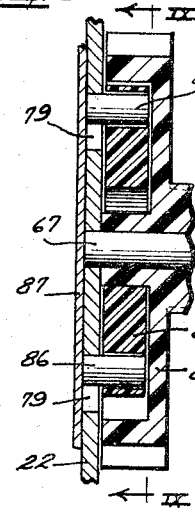
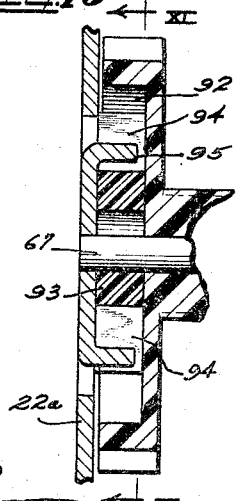
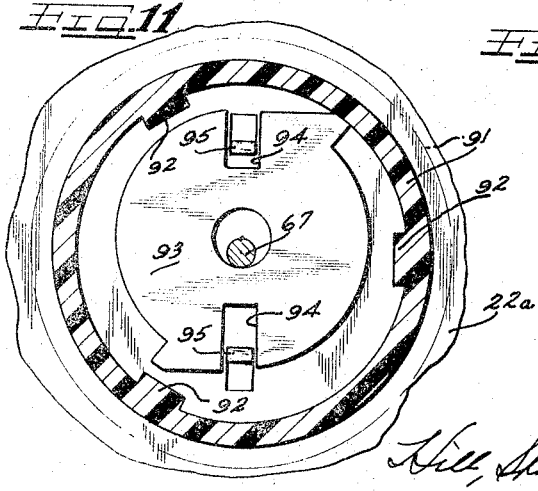
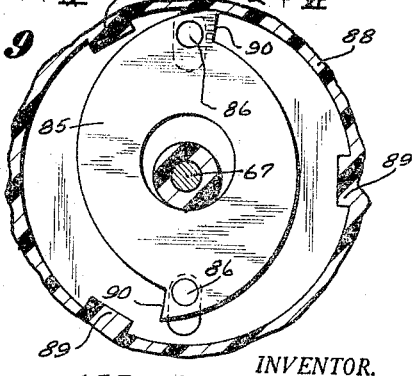
INVENTOR.
LEE A. WOOLLEY
BY
ATTORNEYS

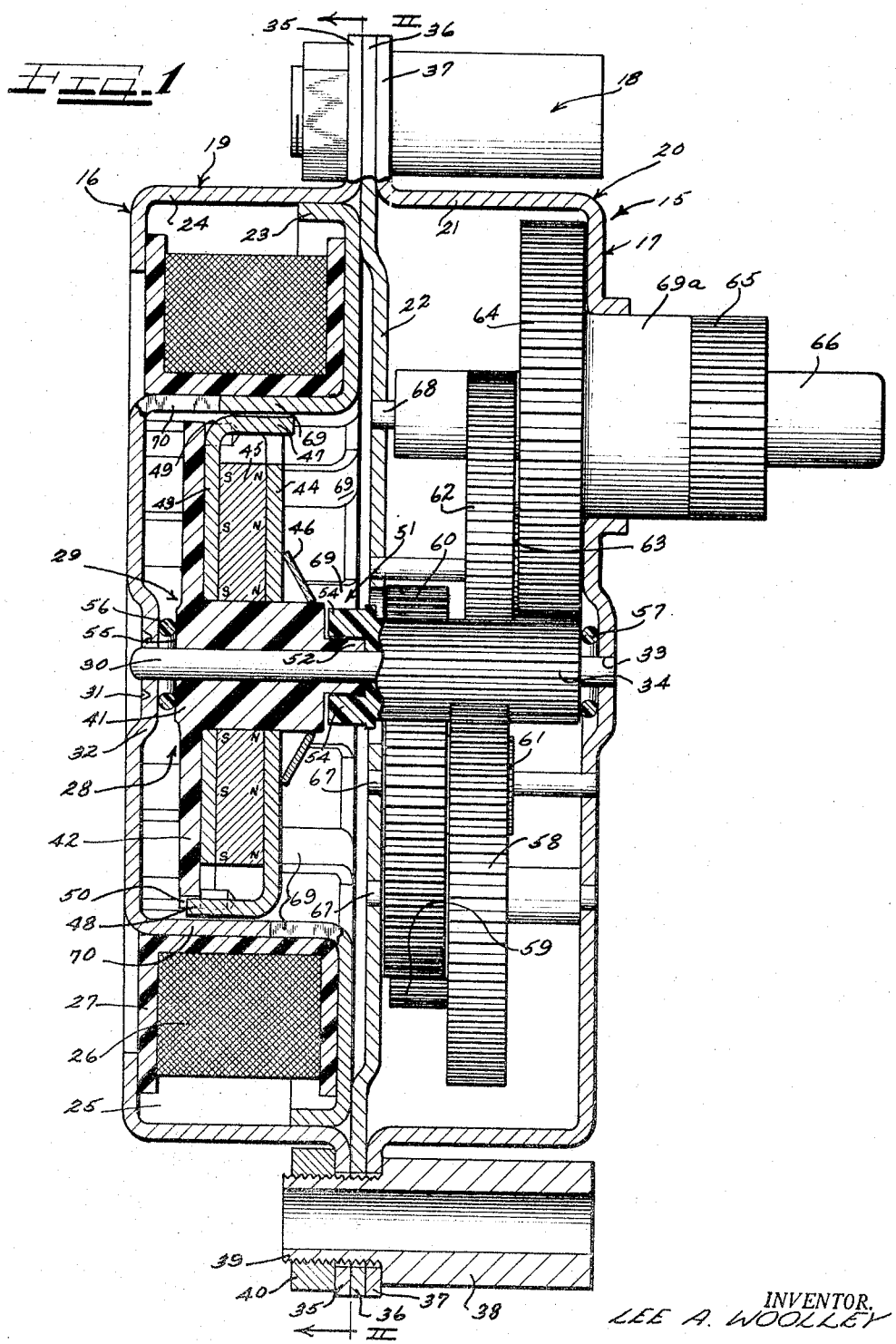

United States Patent Office 3,307,056
Patented Feb. 28, 1967

3,307,056
MOTOR CONSTRUCTION INCLUDING A SLIDING STOP MEMBER OF A UNIDIRECTIONAL DRIVE MECHANISM
Lee A. Woolley, Kokomo, Ind., assignor to Kingston Products Corporation, Kokomo, Ind., a corporation of Indiana
Filed Oct. 15, 1962, Ser. No. 231,325
7 Claims. (Cl. 310—41)

This invention relates generally to electrodynamic devices, and more specifically to an improved structure for a self-starting synchronous motor.

This application is a continuation-in-part of my co-pending application filed September 6, 1961, Serial No. 136,362, which is now abandoned.

Although the principles of the present invention may be included in various devices, a particularly useful application is made in a synchronous motor of the clock type in which a self-starting permanently magnetic rotor is drivingly connected to a gear train incorporated within the structure of the device.

Although synchronous motors of the self-starting type have been used for some time, various problems have arisen in connection with their manufacture and use. Some have employed costly or strategic materials, others have required considerable labor to assemble, others have been composed of components produced by comparatively expensive manufacturing processes, some have had inadequate torque, some have been excessively large, and others have been too noisy.

The motor of this invention embodies several features which enable the manufacture of the components on mass production type of machinery, enable the assembly thereof with a minimum of labor of minimum skill, incur a minimum material cost, all the foregoing being achieved in a comparatively small size device having substantial torque, with a minimum of noise produced by operation. The foregoing advantages are particularly pertinent when the motor is employed in a sequential timer as a timer motor.

Accordingly, it is an object of the present invention to provide an improved synchronous electric motor.

A further object of the present invention is to provide a motor characterized by a simplicity of structure combined with versatility and adaptability.

A still further object of the present invention is to provide a structure for a motor which, because of its simplicity, is producible by mass production tooling.

Yet another object of the present invention is to provide a motor such as that described wherein the motor section and the gear train section are readily separable and assemblable as units, together with structural features enabling such separation and assembly.

Another object of the present invention is the provision of means for eliminating motor rotor noise.

A still further object of the present invention is the provision of means for properly synchronizing the phase relationship between a synchronous motor rotor and a remote rotor direction-reversing means.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 1 is an enlarged cross-sectional view of a motor construction provided with improved structural features in accordance with the principles of the present invention;

FIGURE 2 is a cross-sectional view taken along line II—II of FIGURE 1, and partially broken away.

FIGURE 3 is a cross-sectional view showing assembly of certain elements in reduced scale;

FIGURE 4 is a fragmentary cross-sectional view of certain parts shown in elevation in FIGURE 1;

FIGURE 5 is a cross-sectional view taken along line V—V of FIGURE 4;

FIGURES 6 and 7 illustrate a modified form of the structure shown respectively in FIGURES 5 and 4, FIGURE 6 being taken along line VI—VI of FIGURE 7;

FIGURES 8 and 9 show a further modification of the structure of FIGURES 4 and 5, FIGURE 9 being taken along line IX—IX of FIGURE 8; and FIGURES 10 and 11 show a still further modification structure shown respectively in FIGURES 5 and 4, FIG-being taken along line XI—XI of FIGURE 10.

As shown on the drawings:

The principles of this invention are particularly useful when embodied in a unitized synchronous electric motor assembly such as illustrated in FIGURE 1, generally indicated by the numeral 15. Although all of the features of the invention disclosed herein can be employed to advantage in a synchronous electric motor, it is to be understood that certain features of this invention can be utilized in other devices, and that therefore the disclosure is to be considered exemplary.

The motor assembly 15 includes a motor section generally indicated at 16, a gear train section generally indicated at 17, and appropriate mounting means generally indicated at 18.

The motor assembly 15 is enclosed by case means which in this embodiment includes a first case 19 for the motor section 16, and a second case 20 for the gear train section 17. The case 20 includes a cup-shaped case element 21 and a nearly flat case element 22. The case elements 21 and 22 are complemental to each other and jointly comprise the sole case means or case for the gear train section 17, and encase only the gear train section 17. The case 20 provides support for the gear train which comprises gears and elements identified later herein, and therefore the case 20, and in particular the case element 22 may be considered as a part of the frame of the motor assembly 15.

The case 19 for the motor section 16 includes a pair of cup-like magnetic field members 23, 24 which are pressed together as explained later herein, and which enclose the electrical structure of the motor assembly 15. The magnetic field members 23 and 24 jointly define an annular recess 25 for the motor winding 26 which is carried on a rigid plastic bobbin 27, and also define a rotor cavity 28 within which there is disposed a permanently magnetic rotor assembly generally indicated at 29.

Support means in the form of a pin 30 are rigidly secured as by staking 31 to an end wall 32 of the magnetic field member 24. The support pin 30 is disposed concentrically within the rotor cavity 28 and slidably receives the rotor element 29 thereon. At the other end, the support pin 30 is slidably received into a recess or aperture 33 in the case element 21, and also supports a rotor pinion 34 slidably thereon. It is to be noted that the end wall 32 of the magnetic field member 24 is recessed around the staking 31 so that the end of the support pin 30 does not project beyond the outer plane of field member 24. The field member 24 is provided with a pair of lugs 35, 35 which register with similar lugs 36, 37 respectively carried by the case elements 22 and 21. The mounting means 18 comprises a hollow standoff member 38 having a reduced threaded end 39 extending through the lugs 35–37 and receiving a nut 40 by which the cases 19 and 20 are secured together to comprise a single case means. It will be understood that the motor section 16 may be assembled as a unit and the gear train section 17 assembled as a separate unit, the sections 16 and 17 then being slidably engageable with each other for both assembly and disassembly, the sections 16, 17 being held together at the lugs 35–37 by appropriate means. This structure is particularly advantageous since other gear train sections 17 having different speed reductions may be readily initially assembled or substituted. Moreover, when the mounting means 18 are removed, there is immediate access to all of the moving parts of both sections 16 and 17.

The rotor 29 includes a hub or hub portion 41 of non-magnetic material, such as a rigid plastic, a preferred type being a polymerized formaldehyde type of resin. The hub or hub portion 41 is provided with an integral flange 42 which extends radially therefrom and which serves as a backing means for a stack of elements including a pair of magnetic pole plates 43, 44 which are spaced apart by a permanent magnet 45. The pole plates 43, 44 and the magnet 45 are arranged coaxially with the rotational axis of the rotor 29 and are held securely against the flange 42 by appropriate retaining means such as a spring clip 46. Each of the pole plates 43, 44 is provided with a set of pole elements which extend parallel to the axis of rotation and which are interfitted with each other. In this embodiment, the pole plates 43, 44 are identical to each other and are each provided with eleven pole elements, a pole element 47 shown on FIGURE 2 being typical of the pole elements of the pole plate 43, and a pole element 48 being typical of the pole elements of the pole plate 44.

As best seen in FIGURE 2, the pole elements 47 are disposed uniformly about the axis of rotation, as are also the pole elements 48. Each of pole elements 48 is interfitted centrally within the space between two pole elements 47. All of the pole elements 47 and 48 are of the same size and they are uniformly distributed about the rotational axis. In this embodiment, south magnetic field polarity is induced in the pole plate 43 and hence in the pole elements 47, while north magnetic polarity is induced in the pole plate 44 and hence in the pole elements 48. Thus the poles 47 and 48 are of alternate magnetic polarity.

In this embodiment, friction maintained by the retaining means 46 will insure and maintain the uniformity of spacing of the pole elements 47 and 48. However, if desired the flange 42 may be adapted to positively maintain the proper alignment and spacing. To this end, the plastic flange 42 secured to the hub 41 may be provided with a series of integral rigid plastic finger means 49 disposed at each side of each pole element 47. The flange 42 is provided with a series of peripheral notches 50 respectively receiving the tips of the pole elements 48. Where each pole plate 43, 44 is provided with an odd number of poles, such as eleven herein, it is preferred that the locking or angular maintaining means be provided for each pair of oppositely polarized poles so that the resulting structure will be inherently balanced. Therefore, the means integral with the plastic hub flange 42 which engages and aligns either pole plate is repeated by a number of times equal to the number of pole elements in one of such plates, such means being equally spaced about the axis of rotation.

As seen in FIGURES 1 and 2, there is provided a driving connection generally indicated at 51 between an end of the hub 41 and the rotor pinion 34. The driving connection 51 comprises a slidably separable angular lost motion connection, and to this end, employs means integral with the hub 41 and the rotor pinion 34 which complement each other to that end. Thus the means which comprises the driving connection are coaxial and rotatable about the support pin 30. In the illustrated embodiment, the driving connection 51 includes a portion 52 of reduced diameter integral with the hub 41, and from which a pair of tongue means 53, 53 extends radially.

For cooperation therewith, the driving connection 51 further includes a pair of pin means 54, 54 which extend parallel to the rotational axis of the rotor pinion 34, and which are integrally secured thereto at points radially offset from the rotational axis. The spacing between the pins 54, 54 is substantially the same as the diameter of the reduced diameter portion 52. Since these elements have a common rotational axis, the pins 54, 54 can move as a unit about a portion of the periphery of the reduced diameter portion 52 for an angle which is limited by engagement between the pin means 54 and the tongue means 53.

The rotor pinion 34 preferably comprises flexible non-resilient plastic to enable deformation of the pins 54, 54, and the pinion gear teeth, and of the body of the pinion 34 between the pins 54, 54 and the point where the gear teeth are meshed therewith. An example of such material is polyurethane having a Shore Durometer "A" hardness reading of about 80. A sample having a reading of about 92 has been determined experimentally to be excessively hard. Because of this flexibility the pins 54, 54 tend to spread out, the gear teeth tend to yield and the body of the pinion 34 tends to twist. A further result obtained by the yieldability is explained below.

This specific driving connection structure is particularly advantageous in that it is slidably separable in an axial direction. As explained below the instant motor section 16 is of the type which inherently is capable of starting in either direction. It is possible that the motor section 16 may attempt to start against a full load. Other motors have been known to fail to start when an attempt is made to start against a full load. To lessen the likelihood of failure to start because of the load, and to increase the mechanical energy in the rotor 29 for starts in the wrong direction, the instant driving connection 51 is particularly advantageous.

The rotor 29 and rotor pinion 34 are slidable axially on the support pin 30. There is a tendency for the rotor to vibrate axially and cause noise. Further, these elements require an appropriate low friction thrust element, so that if the motor is disposed with the support pin 30 in a non-horizontal position, there will not result an excess of friction between the case means and the rotating parts. In the instant embodiment, there is provided an appropriate noise-suppressing thrust element on opposite sides of the rotor 29. More specifically, the hub 41 has an axial end face 55 disposed in spaced confronting relation to a portion of the case means, and in this space, there is disposed a soft plastic thrust ring 56 which encircles the rotational axis. The ring 56 preferably comprises polyurethane plastic. Vinyl plastic may also be used but is less satisfactory. The plastic should be soft or "dead," i.e. non-resilient, to absorb energy. At the other side of the rotor adjacent to a remote end of the rotor pinion 34 there may be provided a second soft plastic thrust ring 57 which likewise encircles the rotational axis. The ring 57 preferably comprises polyurethane plastic and therefore may comprise an integral extension of the polyurethane pinion 34. I have found that this combination of materials is advantageous from a performance and from a cost standpoint, while the simplicity of construction is clearly evident. Thus the thrust rings 56 and 57 or the thrust ring 56 and the corresponding end of the polyurethane pinion 34, will coact with the rotor 29 and rotor pinion 34 and the adjacent case means to damp axial rotor vibrations and to accommodate any axial thrust which may be present.

The separable rotor pinion 34 meshes with a molded plastic gear 58 which has an integral pinion 59 in mesh with a rotary gear 60. The gear 60 is likewise constructed of molded plastic and is provided with an integral pinion 61 which meshes with a gear 62. The gear 62 likewise is of molded plastic and has an integral pinion 63 in mesh with a molded gear 64. The gear 64 likewise comprises molded plastic and has an integral output pinion 65 and a reduced outer diameter portion 66. Thus all of the gears and pinions comprise plastic. Each of the gears 58, 60, and 62 is axially hollow and is supported on a pin 67 staked to the case element 22. The opposite ends of the pins 67 are slidably received in close fitting apertures in the case element 21. The gear 64 is slidably and rotatably supported on a pin 68, likewise staked to the case element 22, its other end terminating within the gear 64 which has a bearing portion 69a rotatably supported in the case element 21. To supplement this support of the gear 64, the outboard reduced portion 66 may be provided with bearing support in the device to be driven if desired.

The magnetic field members 23, 24 which serve as a case for the motor section 16, also provide the magnetic circuit portions of the stator of the motor section 16. The field member 23 is generally annular in configuration having a central opening through which the rotor 29 is inserted. At the inner periphery of the magnetic field member 23, there is a set of salient poles, each identified by the numeral 69. These extend in a direction parallel to the axis of rotation and are arranged in a circular configuration just radially outward of the rotor poles 47, 48. The field member 23 lies at one side of the coil assembly, and when alternating current is applied to the coil, a resulting magnetic field having instantaneous alternating polarities is induced in the field member 23 and thus conducted to the salient poles 69.

Similarly, the magnetic field member 24 is provided with a set of circularly arranged salient poles 70 which are appropriately circularly arranged and properly interfitted with the salient poles 69. In a similar manner, opposite instantaneous polarities of magnetic field are induced in the poles 70.

As best seen in FIGURE 2, the salient poles 69 and 70 are arranged in a pattern wherein one-half of the salient poles are shifted ninety electrical degrees with respect to the other half of the salient poles, whereby good starting and operating torques are obtained.

In this embodiment, the stator employs two less poles than the rotor. Since the rotor employs an even total number of poles, the total number of stator poles is also even. In the preferred disclosed embodiment there thus are twenty-two rotor poles and twenty stator poles. The total number of stator poles is a multiple of four whereby the stator poles can be arranged, as they are here, in four separate groups. The arrangement of the stator poles is thus dependent upon the number of rotor poles. For purposes of describing the arrangement of poles, the angle α is employed and is defined as the angle obtained by dividing the total number of uniformly spaced poles into 360°. This angle is also referred to herein as the pole spacing, and electrically it represents 180°.

Considering the view of the stator shown in FIGURE 2, the upper right hand quadrant includes three stator poles 69 and two stator poles 70 mutually spaced from each other by the angle α, and being of alternate polarity. This group of poles is referred to herein as a pole division.

Diametrically oppoiste thereto, illustrated in the lower left-hand quadrant, there is a second divison containing five poles, two being poles 69 and three being poles 70. These poles are likewise spaced from each other by the angle α.

In the lower right-hand quadrant there is a third division of poles, which like the first division described, contains three poles 69 and two poles 70, while diametrically opposite thereto in the upper left-hand quadrant there is a division containing three poles 70 and two poles 69.

Within each division, the angle between two similar poles is equal to twice α. However, attention is invited to the fact that the included angle between two similar poles 69 adjacent each other between the first and third described divisions is not twice α, but one and one-half times α. Diametrically opposite thereto, the angle between two poles 70 likewise is not twice α but is one and one-half times α. Considering the first and second described divisions as a reference, the third and fourth divisions can therefore be said to have been shifted clockwise by an angle equal to one-half α, or one-half pole spacing. This "shift" increases the angle between the pole 69 and the pole 70 between the first and fourth described divisions to one and one-half times α, and likewise increases the spacing between the diametrically opposite pair of stator poles to one and one-half times α. The rotor can be so disposed that half of its poles are simultaneously aligned with the poles of diametrically opposite divisions, while the poles of the other diametrically opposite divisions are then disposed in a position which is shifted one-half pole spacing or ninety electrical degrees from then being aligned.

In this embodiment, the individual rotor poles 47 and 48 are of uniform size, and similarly, the individual stator poles 69 and 70 are also of uniform size. With this novel pole arrangement, although the stator poles are arranged nonuniformly because of the arrangement in four separate divisions, the number of poles 69 is equal to the number of poles 70.

It will be noted that between each of the adjacent pole divisions, there is a space within which no pole is provided. As best seen in FIGURES 2 and 3, the rigid plastic bobbin 27 is provided with four internally projecting splines 71, which project from the inner periphery thereof into these spaces between the adjacent pole divisions. The width of each of the splines 71 corresponds to the width of the space between the divisions whereby each spline abuts the adjacent salient poles. This structure serves to lock and to maintain the relative angular spacing between the set of poles 70 and the set of poles 69.

The splines 71 serve a further purpose as illustrated in FIGURE 3. During the assembly of the stator of the motor section 16, one of the field members 23 is placed on the coil assembly's bobbin 27 with adjacent salient poles 69 embracing one of the splines 71. This assembly locks the field member 23 angularly with respect to the bobbin 27. In like manner, the field member 24 is assembled to the bobbin 27 with a pair of its pole members 70 embracing the opposite spline 71 in a similar manner. This relationship locks the relative angular position between the field member 24 and the bobbin 27. The field members 23 and 24 are thereby provided with the proper relative angular spacing, after which the field members 23 and 24 are pressed together with the various poles 69 and 70 interfitting as described.

To further ease the assembly just described, it is preferable that an appropriate number of cam surfaces 72, shown in FIGURE 3, be provided for appropriate poles 69 and 70. The cam surfaces 72 ease the initial reception of the sets of poles into the bobbin cavity, and by joint coaction with the corresponding spline, effect relative angular rotation between the bobbin 27 and the field members 23 and 24. Thus the splines and cam surfaces coact to shift the actual position of the field members into proper alignment and to hold them while they are being pressed together. Moreover, once the assembly has been completed, the splines 71 continue to act on the abutting pole elements to maintain the proper spacing between the sets of poles 69 and 70. Thus the field members 23 and 24 are complemental as to their pole structure, are complemental in that they jointly define the recess for the coil assembly, and are complemental in that they telescope together. It is emphasized that the splines 71 are the sole means which determine the relative angular relation between the field members 23 and 24 while they are being assembled.

The motor section 16 described is inherently capable of initiating rotation when energized in either direction of rotation. In a typical installation, rotation is desired solely in one direction. In order to insure that the motor section 16 will continue to run only in the desired or predetermined direction, means are provided for mechanically reversing the direction of rotor rotation only in the event that the motor should begin to rotate in the wrong direction. The means provided for this purpose have several advantages over prior mechanical reversing structures, which advantages will become evident as this description proceeds.

It has already been brought out that operation of the rotor 29 in either direction will ultimately rotate the separate rotor pinion 34 which drives the gear 58, which through the pinion 59 drives the gear 60. The gear 60 is disposed adjacent to the frame, and in particular, is disposed adjacent to the case element 22, and is constructed with an internal annular recess 73 directed toward the frame or case element 22 as best shown in FIGURE 4, the recess 73 being substantially concentric with the gear 60. Within the recess 73 there is disposed a stop member 74 which is provided with an enlarged aperture 75 to enable the stop member 74 to slide in a plan transverse to the axis of rotation within the recess 73. The stop member 74 has a peripheral cam track or surface 76 and at least one transverse or substantially radial stop face 77. The stop member 74 is provided with rigid integral projecting means in the form of a pair of pins 78, 78 received in linear slots 79, 79 by which the stop member 74 is slidably linearly guided within the recess 73. The rigid plastic gear 60 or rotary means is provided with an integral finger 80 which extends into the recess 73 in a radially inward direction and which is engageable with the cam track or surface 76 and with the transverse stop face 77.

When the motor starts in the correct direction and during normal running thereof, the gear 60 is caused to rotate in a clockwise direction as viewed in FIGURE 5. During such rotation, the finger 80 acts on the peripheral cam surface 76 to displace the stop member 74 toward the opposite side of the recess 73, there being just sufficient clearance for the finger to easily pass over the end of the cam surface at the stop face 77. As rotation continues, the finger 80 engages the opposite cam surface 76 to displace the stop member 74 to the opposite side of the recess 73. There is sufficient friction between the parts so that the stop member 74 will remain in the position to which it has been displaced by the finger 80. Once the stop member 74 has been displaced in a particular direction, such displacement places one of the transverse stop faces 77 in what would be the path of the finger 80 if the finger 80 were thereafter rotated in the opposite or counterclockwise direction. Thus if the motor section drives the gear 60 in the wrong direction, such rotation in the wrong direction can continue only until movement of the finger 80 is blocked by engagement with the stop face 77 which is disposed in its path. Once such engagement occurs, the gear 60 will be caused to rebound and to drive, through the gear 58, the motor pinion 34 which takes up the play in the connection 51 and then acts on the rotor hub 41 to reverse the direction of rotation of the rotor 29.

Within the angle represented by one pole spacing, the magnetic torque applied to the rotor varies in magnitude. Ideally, the rotor reversing mechanism should be so constructed that its maximum rotor-reversing torque is synchronized properly with the magnetic torque. Where the reversing mechanism is mechanically carried on the rotor, this synchronism is easily designed into the structure, but where, as in the foregoing embodiment, the reversing mechanism acts on a subsequent element, proper synchronization is difficult to insure. However, I have found that by providing a non-resilient flexible element between the rotor and the reversing mechanism, the reliability of ideal synchronization is achieved. While such yieldability is preferably provided by the soft plastic energy-absorbent pinion 34 described above, it could be provided in the gear and pinion 58–59, in the gear and finger 60, 80, or in the stop member 74. Thus by making the pinion 34 of soft energy-absorbent plastic, several added advantages are obtained which, in summary, are: damping of axial rotor vibration, synchronization of reversing mechanism, and thrust bearing support with the separate thrust ring 57 omitted.

If continuous rotation is desired in the opposite direction, it is necessary to provide a stop member having either a reverse configuration, or a reversible configuration. The profile of a stop member having a reverse configuration is shown in FIGURE 6. If such a stop member were employed, the opposite edge of the finger 80 would engage and cause rebounding.

The structure shown in FIGURES 6 and 7 represents a reversible stop member 81 having rigid projecting means in the form of integral pins 82 projecting from opposite faces of the stop member. To accommodate the alternative projecting means 82, a gear 83 is employed which includes a further annular recess 84. When the stop member 81 has been removed, inverted, and reinstalled, the operation of the form shown in FIGURES 6 and 7 is identical to that shown in FIGURES 4 and 5.

Referring now to FIGURES 8 and 9, it will be noted that a stop member 85 has been provided which includes rigid projecting means 86 which are axially slidable to enable reversal of the position of the stop member 85 from that shown in FIGURE 9 to that shown in FIGURE 6. The feature of slidable projecting means 86 enables the gear 60 to be employed which is of slightly less axial extent than the gear 83. If the friction between the projecting means 86 and the stop member 85 is insufficient to reliably hold the means 86 in assembled relation, an appropriate backup plate 87 may be provided and welded to the opposite side of the case element 22 in position over the slots 79. In this embodiment, there is however disclosed a gear 88 which is identical to the gear 60 except that three fingers 89 are provided. Thus, in this embodiment there are a plurality of fingers 89 and a lesser plurality of stop faces 90. The combination of fingers and stop faces disclosed in this embodiment is particularly advantageous when an earlier arresting of rotor motion is desired. One example of a condition where earlier arresting is desired would be where the reversing mechanism as a whole is associated with a gear such as the gear 62 or 64 which are slower turning gears.

Referring now to FIGURES 10 and 11, there is shown a structure which employs a gear 91, quite similar to the gear 88, having fingers 92 which cooperate with a stop member 93. However, in this embodiment, the stop member 93 is provided with a pair of slots 94, 94 in which there are disposed guide fingers 95, 95 which are integral with and struck up from a case element 22a.

In the forms of the invention shown in FIGURES 5 and 6, there are two possible places within one revolution of the gear where the integral finger might be arrested and rebounded. In the forms of the invention shown in FIGURES 9 and 11, it is evident that there are six possible places where the gear may be arrested and have its rotational direction reversed by rebound. The various stop members 74, 81, 85, and 93 comprise rigid plastic of the same type as disclosed herein for the rotor hub 41 and gearing.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A mechanism for insuring that a synchronous electric motor will rotate in a predetermined direction comprising: rotary means adapted to be driven by said motor and having an internal recess, said means including a finger extending into said recess; a stop member supported against rotation about the axis of said rotary means, and also supported for reciprocatory sliding movement in a plane transverse to the rotational axis of said rotary means and disposed within said recess, said stop member having a peripheral cam track terminating in at least one transverse stop face, and engageable with said finger; said stop member being reciprocable by said finger's engagement with said cam track in response to rotation of said rotary means in one direction, and said transverse stop face being operative to arrest movement rotation of said finger in response to initial rotation of said rotary means in the opposite direction, and to reverse the direction of rotation of said rotary means.

2. In a synchronous electric motor assembly having a rotor drivingly connected to a gear train therein supported by a frame, the improvement comprising: a finger rotatably driven by a gear of the gear train and having an extent in a radially inward direction from said gear toward its axis of rotation; a stop member having means slidably guiding it for linear movement on the frame and having means restraining it against rotation about the rotational axis of said finger, said stop member having an external peripheral cam surface engageable by said finger during rotation of said gear in one direction by which said finger displaces a stop face on said stop member into the path of said finger for joint engagement and rebound in the event said gear is thereafter rotated in an opposite direction.

3. In a synchronous electric motor assembly having a rotor drivingly connected to a gear train therein supported by a frame, the improvement comprising: a finger rotatably driven by a gear of the gear train and having an extent in a radially inward direction from said gear toward its axis of rotation; a stop member having rigid projecting means extending into fixed slot means in the frame and operative to slidably guide said member for linear movement and to preclude rotation of said stop member about the rotational axis of said finger, said stop member having an external peripheral cam surface engageable by said finger during rotation of said gear in one direction by which said finger displaces a stop face on said stop member into the path of said finger for joint engagement and rebound in the event said gear is thereafter rotated in an opposite direction.

4. In a synchronous electric motor assembly having a rotor drivingly connected to a gear train therein supported by a frame, the improvement comprising: means defining an internal concentric recess in a rotary gear of the gear train, said means including a finger integral with said gear and extending into said recess in a radially inward direction toward its axis of rotation; a rigid stop member; means slidably supporting and guiding said stop member for linear movement on the frame in a plane transverse to said axis and preventing rotation of said stop member about said axis, said member being disposed within said recess, said stop member having an external peripheral cam track terminating in a substantially radial stop face, and engageable with said finger; said stop member being normally reciprocable by said finger's engagement with said cam track during rotation of said gear in one direction, by which said stop face is displaced into the path of said finger for joint engagement and rebound only in the event that said gear and finger are thereafter rotated in an opposite direction.

5. A unitized synchronous electric motor assembly comprising in combination: a motor section having a rotor; a gear train having a frame and including a separate rotor pinion coaxial with the rotor; said rotor and said rotor pinion respectively having a pair of complemental coaxial means jointly defining an angular lost motion driving connection between said rotor and said rotor pinion; a finger rotatably driven by a gear of the gear train and having an extent in a radially inward direction from said gear toward its axis of rotation; a stop member having means slidably guiding it for linear movement on the frame and against rotation about the rotational axis of said finger, said stop member having an external peripheral cam surface engageable by said finger during rotation of said gear in one direction by which said finger displaces a stop face on said stop member into the path of said finger for joint engagement and rebound in the event said rotor thereafter begins to drive said gear in an opposite direction.

6. In a synchronous electric motor assembly having a rotor drivingly connected to a gear train therein supported by a frame, the improvement comprising: a plurality of angularly spaced fingers rotatably driven by a gear of the gear train and having an extent in a radially inward direction from said gear toward its axis of rotation; a stop member having means slidably guiding it for linear movement on the frame and said means preventing rotation of said stop member about the rotational axis of said fingers, said stop member having a lesser plurality of external peripheral cam tracks each terminating in a radial stop face, and each normally successively engageable by said fingers during rotation of said gear in one direction to reciprocate said stop member; one of the stop faces being abuttable by one of said fingers during initial rotation of said gear in an opposite direction, and operative to reverse the direction of rotation of said gear.

7. A unitized synchronous electric motor assembly comprising in combination: a motor section having a rotor; a gear train having a frame and including a separate rotor pinion coaxial with the rotor; said rotor and said rotor pinion respectively having a pair of complemental coaxial means jointly defining an axially separable driving connection between said rotor and said rotor pinion; a finger rotatably driven by a gear of the gear train and having an extent in a radially inward direction from said gear toward its axis of rotation; a stop member having means slidably guiding it for linear movement on the frame and against rotation of said stop member about the rotational axis of said finger, said stop member having an external peripheral cam surface engageable by said finger during rotation of said gear in one direction by which said finger displaces a stop face on said stop member into the path of said finger for joint engagement and rebound in the event said rotor thereafter begins to drive said gear in an opposite direction.

References Cited by the Examiner

UNITED STATES PATENTS

| | | | |
|---|---|---|---|
| 2,423,750 | 7/1947 | Benson | 29—155.5 |
| 2,721,281 | 10/1955 | Morganson | 310—62 |
| 2,795,715 | 6/1957 | Gilchrist | 310—261 |
| 2,810,847 | 10/1957 | Tweedy | 310—254 |
| 2,823,327 | 2/1958 | Kohlhagen | 310—83 |
| 2,894,157 | 7/1959 | Morrill | 310—179 |
| 2,985,778 | 5/1961 | Fritz | 310—41 |
| 2,987,638 | 6/1961 | Lux | 310—90 |
| 3,002,261 | 10/1961 | Avila et al. | 29—155.5 |
| 3,027,469 | 3/1962 | Sidell | 310—41 |
| 3,082,337 | 3/1963 | Horsley | 310—179 |
| 3,082,338 | 3/1963 | Turk | 310—261 |
| 3,081,411 | 3/1963 | Wiley | 310—254 |
| 3,112,818 | 12/1963 | Wooley | 310—41 X |
| 3,150,279 | 9/1964 | Macks | 310—90 |
| 3,163,791 | 12/1964 | Carlson | 310—83 |
| 3,167,672 | 1/1965 | Tupper | 310—90 |
| 3,175,110 | 3/1965 | Kohlhagen | 310—83 |

ORIS L. RADER, *Primary Examiner.*

MILTON O. HIRSHFIELD, *Examiner.*

G. SIMMONS, *Assistant Examiner.*

UNITED STATES PATENT OFFICE
CERTIFICATE OF CORRECTION

Patent No. 3,307,056                       February 28, 1967

Lee A. Woolley

It is certified that error appears in the above identified patent and that said Letters Patent are hereby corrected as shown below:

In the drawings, sheet 3, Fig. 7, amend the drawing to show clearance immediately below the right-hand pins 82.

Signed and sealed this 29th day of September 1970.

(SEAL)
Attest:

Edward M. Fletcher, Jr.                    WILLIAM E. SCHUYLER, JR.
Attesting Officer                            Commissioner of Patents